US009750653B1

(12) United States Patent
Christmas et al.

(10) Patent No.: US 9,750,653 B1
(45) Date of Patent: Sep. 5, 2017

(54) WALK ASSIST DEVICE CARRIER

(71) Applicants: Thomas R. Christmas, Phoenix, AZ (US); Constance J. Smith, Flagstaff, AZ (US)

(72) Inventors: Thomas R. Christmas, Phoenix, AZ (US); Constance J. Smith, Flagstaff, AZ (US)

( * ) Notice: Subject to any disclaimer, the term of this patent is extended or adjusted under 35 U.S.C. 154(b) by 0 days.

(21) Appl. No.: 15/159,493

(22) Filed: May 19, 2016

Related U.S. Application Data

(60) Provisional application No. 62/174,030, filed on Jun. 11, 2015.

(51) Int. Cl.
*B60R 7/00* (2006.01)
*A61G 5/10* (2006.01)

(52) U.S. Cl.
CPC .................................... *A61G 5/10* (2013.01)

(58) Field of Classification Search
CPC .. A61G 5/1013; A61G 5/1016; A61G 5/1018; A61G 5/1029; A61G 5/1094; A61G 5/10
USPC ........................................................ 224/407
See application file for complete search history.

(56) References Cited

U.S. PATENT DOCUMENTS 4,491,257 A * 1/1985 Ingles .................... A61H 3/00 135/66
4,913,393 A 4/1990 Wood
5,842,615 A * 12/1998 Goodness ................ B60R 9/06 224/485
6,547,112 B2 * 4/2003 Gallagher .............. B60R 11/00 224/401
6,651,683 B1 * 11/2003 Hooks ...................... A45F 5/00 135/66
6,651,946 B1 11/2003 Thornton
7,188,855 B1 * 3/2007 Thomas .................. A61G 5/10 280/288.4
7,726,327 B2 * 6/2010 Battiston ................. A61H 3/04 135/66
7,967,174 B2 * 6/2011 Lauber .................... A61G 5/10 224/407
9,526,306 B2 * 12/2016 Fitzgerald ............. A45B 19/00
2006/0016466 A1 * 1/2006 Carroll .................... A61H 3/04 135/67
2009/0020575 A1 * 1/2009 Katchen ............... A61M 16/10 224/407
2012/0097720 A1 * 4/2012 Lee ....................... A47G 25/12 224/407
2012/0187265 A1 7/2012 Bakerman
2015/0001359 A1 * 1/2015 Catchings ........... F16M 11/041 248/220.22

* cited by examiner

*Primary Examiner* — Derek Battisti
(74) *Attorney, Agent, or Firm* — Cahill Glazer PLC

(57) ABSTRACT

A rigid tube extending along an axis is provided with a rectangular cross-section having enlarged centrally disposed arcuate sections for receiving tubular structural portions of walk assist devices such as canes or crutches. The rigid tube is provided with patterns of threaded mounting holes that accept locking machine bolts extending through mounting holes in a mounting plate; the mounting plate is provided with an arcuate groove for contacting and clamping a structural portion of a wheelchair or walker.

6 Claims, 3 Drawing Sheets

WALK ASSIST DEVICE CARRIER

RELATED APPLICATIONS

This application is related to and claims priority to a provisional application entitled “CANE OR CRUTCH HOLDER FOR ATTACHMENT TO A WHEELCHAIR OR WALKER” filed Jun. 11, 2015, and assigned Ser. No. 62/174,030.

FIELD OF THE INVENTION

The invention relates to an apparatus for carrying a cane or crutches belonging to a handicapped person who must also use a wheelchair or walker.

BACKGROUND OF THE INVENTION

Individuals who are required to use a wheelchair or a walker frequently are capable of limited mobility with the assistance of a cane or crutch. Thus, it is not uncommon for a handicapped person to use the assistance of a cane for brief periods of ambulation but necessarily require the wheelchair, for example, for any significant travel distance. Similarly, an individual having an injury requiring crutches will sometimes require a wheelchair when the distance to be traveled is beyond the endurance or capability of the injured person using crutches. In those instances, the cane or crutch must be carried by the individual in the wheelchair to be available when the wheelchair journey is completed. A similar problem is encountered when the cane or crutch can interfere with a shopping cart. An injured person may be able to use a shopping cart for limited support but will still require a convenient means for transporting his or her cane or crutch.

SUMMARY OF THE INVENTION

The present invention incorporates a rigid cane or crutch carrying tube that is attached to a wheelchair or walker and may be secured to any convenient structural part of the wheelchair such as a horizontal, vertical or angular tube or strut. The cane or crutch is inserted into the tube until the handle of the cane or wide portion of the crutch contacts the upper opening of the tube, or the ground-contacting portion of the cane contacts a channel blocking member in the tube, and is thus supported by the tube while the wheelchair is occupied.

BRIEF DESCRIPTION OF THE DRAWINGS

The present invention may more readily be described by reference to the accompanying drawings in which.

DETAILED DESCRIPTION OF THE INVENTION

Figure 1:
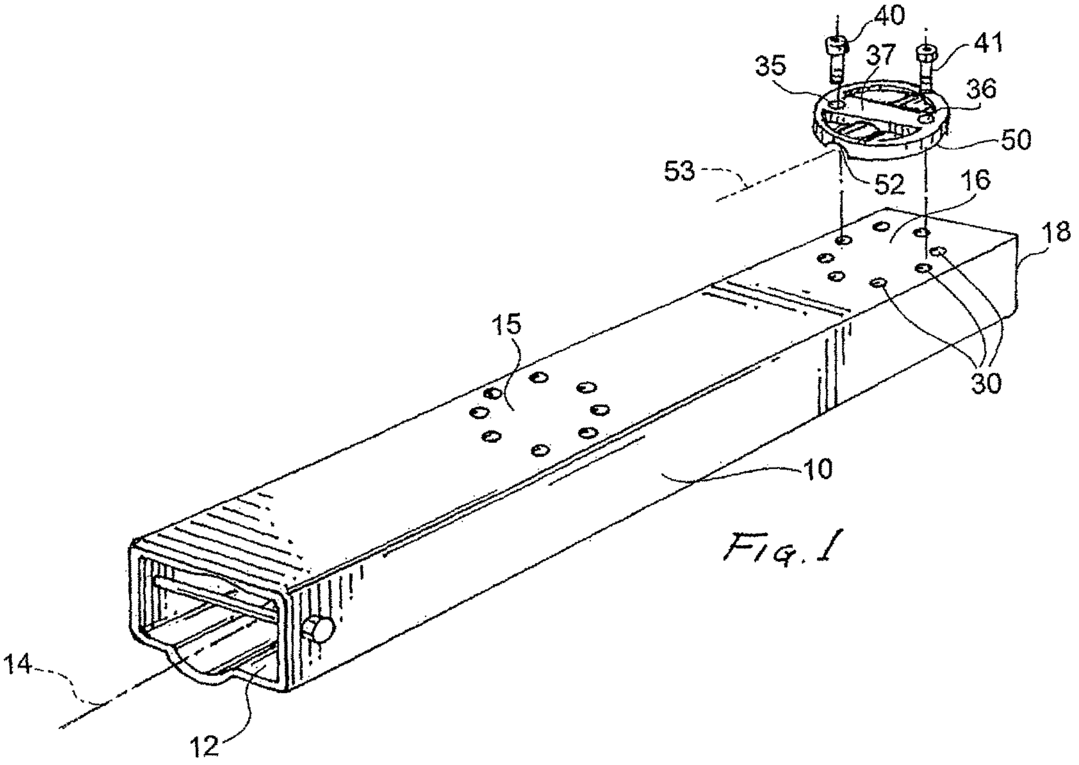
FIG. 1 is an exploded perspective view of a walker assist device carrier constructed in accordance with the teachings of the present invention.
Figure 2:
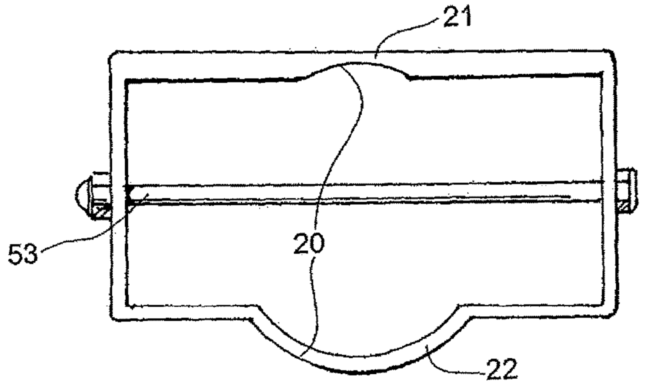
FIG. 2 is an end view of the rigid tube of FIG. 1.
Figure 3:
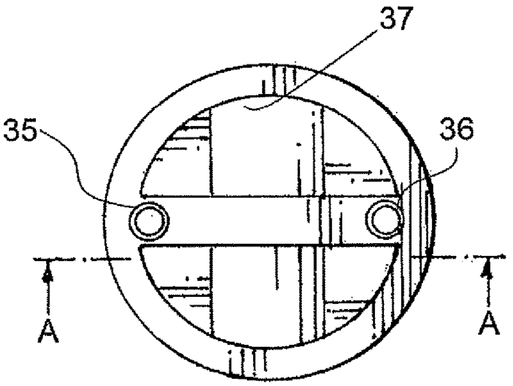
FIG. 3 is a plan view of the anchor or mounting plate of FIG. 1.
Figure 5:
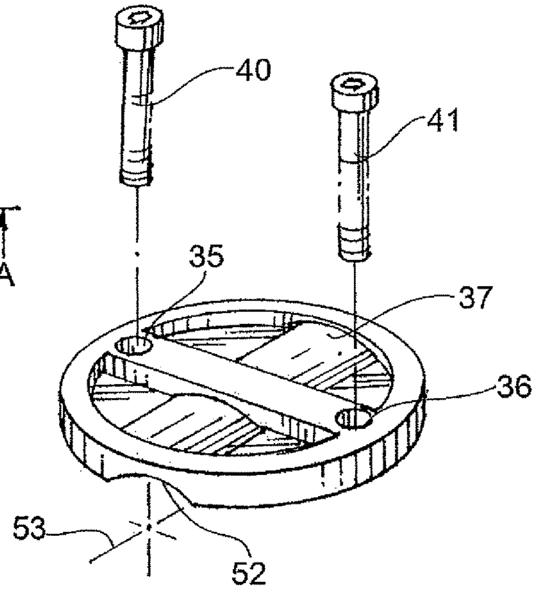
FIG. 5 is a perspective view of the mounting plate shown in FIG. 1 with the machine bolts positioned for insertion into the mounting plate holes.

Referring to FIG. 1, an exploded perspective view of a walk assist carrier device holder constructed in accordance with the teachings of the present invention is shown. The holder includes a rigid tube 10 having a longitudinal channel 12 extending therethrough along the tube axis 14. The rigid tube 10 may be formed of any rigid material, but is preferably made of commercially available ultra violet resistant ABS. Threaded mounting hole patterns 15 and 16 are provided adjacent one end 18 of the tube and at approximately the center position on the tube. The rigid tube 10 is provided with an essentially rectangular cross-section (FIG. 2) with an enlarged centrally disposed arcuate section 20 provided in the top wall 21 and the bottom wall 22 to accommodate cylindrical structural portions of walk assist devices such as canes or crutches. Each threaded mounting hole pattern 15 and 16 incorporates a plurality of holes 30 arranged in a circular pattern and, in the embodiment chosen for illustration, include eight holes arranged in diametrically opposed pairs and spaced from each other a distance equal to the distance between mounting plate holes 35 and 36 provided in an anchor or mounting plate 37.

A choice of eight threaded holes in each pattern permits the attachment of the mounting plate 37 to the rigid tube 10 with an angular orientation of forty-five degree intervals with respect to the rigid tube axis 14. Thus, the rigid tube 10 may be secured to a supporting frame member of a wheelchair or walker parallel to, forty-five or ninety degrees with respect to a longitudinal axis of the supporting frame member. A greater number of threaded holes may be provided to accommodate a greater range of angular selection for the mounting of the rigid tube.

The anchor or mounting plate 37 includes mounting plate holes 35 and 36 to admit locking machine screws or bolts 40 and 41; the mounting plate holes are unthreaded and are of sufficient diameter to accept the passage of the shanks of the locking screws or bolts.

The lower surface 50 of the mounting plate incorporates an arcuate groove 52 extending along an arcuate groove axis 53 that forms a channel to contact a frame member or other structural member of a wheelchair or walker.

The upper or top wall 21 of the rigid tube is provided with an increased thickness to facilitate forming threads in the threaded holes 30 to receive the threads of the locking machine screws 40, 41 and to provide strength when the tube is mounted and clamped to the wheelchair or walker.

If desired, the threaded mounting holes may be replaced by internally threaded brass or metallic eyelets secured in enlarged mounting holes to receive the locking screws to provide increased strength and durability when compared to the internally threaded holes in the tube wherein the internal threads of the holes are formed of a plastic material with which the tube is made.

Figure 4:
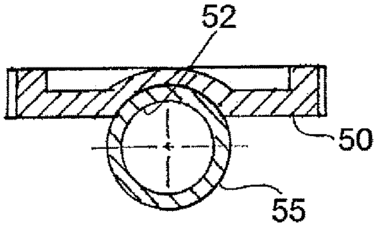
FIG. 4 is a cross-sectional view of FIG. 3 taken along line A-A.

In use, the rigid tube 10 is positioned adjacent the chosen structural member 55 (FIG. 4) of the wheelchair or walker. The structural member will normally comprise a cylindrical aluminum or other metallic or rigid plastic component; the tubular axis 14 of the rigid tube 10 is aligned with the axis of the structural member and is positioned at a convenient height with respect to the potential user of the wheelchair or walker. The mounting plate 37 is then placed against the structural member with the arcuate groove or channel 52 in contact with the structural member and aligning the mounting plate 37 opposite one of the mounting plate hole patterns 15 and 16. The rigid tube 10 may then be arranged at the most convenient angular relationship with respect to the structural member and the mounting plate holes 35 and 36 in the mounting plate opposite and aligned with a corresponding pair of threaded mounting holes 30 provided in the rigid tube. The locking machine bolts or screws 40, 41 are then inserted through the mounting plate holes and threaded into the selected threaded mounting holes in the rigid tube. The machine bolts or screws are then firmly tightened to thus clamp the structural member of the wheelchair or walker between the mounting plate and the rigid tube.

The rigid tube 10 is thus mounted on the wheelchair or walker and conveniently carries walk assist devices such as canes or crutches which may be inserted into the rigid tube. A channel blocking member 53 is provided at one end of the rigid tube; in the embodiment chosen for illustration the blocking member comprises an elongated bolt extending between the sides of the rectangular tube that blocks the opening of the bottom end of the tube. The channel blocking member prevents the cane or crutch being supported by the tube from extending through the tube and possibly interfering with the operation of the wheelchair or walker to which the tube is attached.

Figure 6:
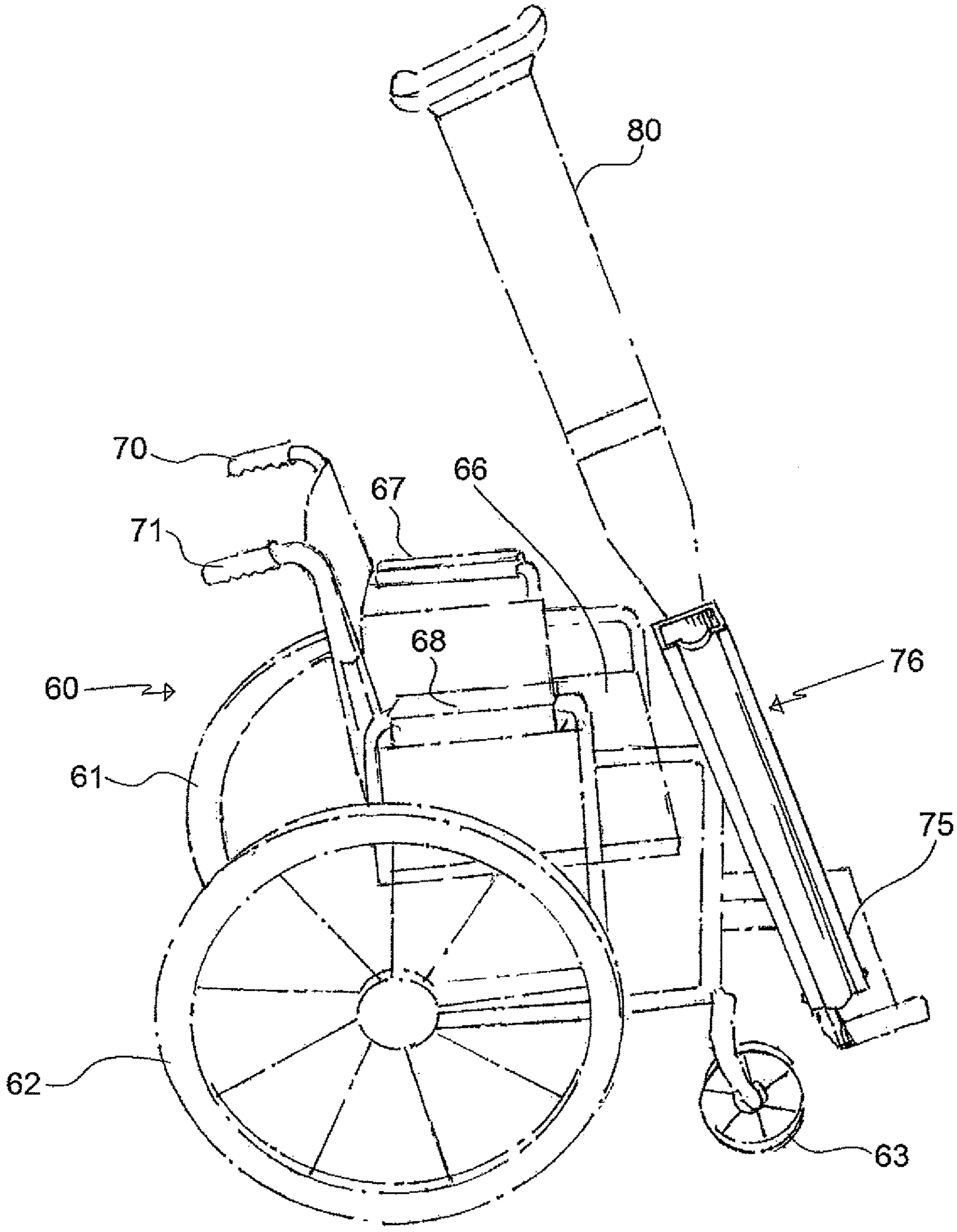
FIG. 6 is a schematic perspective view of a wheelchair having the walker assist device carrier mounted thereon.

Referring to FIG. 6, a schematic representation of a wheelchair is shown upon which the walk assist device carrier of the present invention is mounted. The wheelchair 60 includes seat portion 66 and is provided with arm rests 67 and 68 and a pair of handles 70 and 71 that may be utilized to assist or power the wheelchair by an assisting individual. The wheelchair is also provided with a conventional footrest 75 which is secured to the wheelchair and forms a part thereof. The walk assist device carrier 76 constructed in accordance with the teachings of the present invention, is secured to a structural member of the wheelchair such as the structural member 55 shown in FIG. 4. In the example chosen for illustration in FIG. 6, a walk assist device in the form of a crutch 80 is shown mounted in the walk assist device carrier 76. The individual requiring the walk assist device or crutch 80 may then conveniently position the crutch in the walk assist device carrier 76 and proceed to transport him or herself through the power wheels 61 and 62 or, alternatively, be transported through an assisting individual using the handles 70 and 71. In either situation, without the walk assist device carrier of the present invention, the crutch 80 would be a cumbersome and inconvenient but necessary device to be transported with the disabled person using the wheelchair. The walk assist device carrier 76 permits the crutch to be conveniently carried, without any interference with the movement of the wheelchair, while nevertheless permitting the crutch to be conveniently removed when the wheelchair occupant desires or needs to use the crutch.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. A walk assist device carrier comprising:

(a) a rigid tubular member having a rectangular cross-section and a top and a bottom wall and having internally centrally disposed arcuate sections formed in said top and bottom wall;

(b) a plurality of threaded holes formed in the top wall of said rigid tubular member, said threaded holes arranged having opposing pairs of threaded holes spaced a predetermined distance with respect to each other;

(c) a mounting plate having a pair of unthreaded mounting plate holes extending therethrough, said mounting plate holes spaced said predetermined distance with respect to each other;

(d) said mounting plate having an arcuate grooved formed in a bottom surface thereof extending along an arcuate groove axis for engaging and clamping a structural member of a wheelchair, walker or other conveyance between said mounting plate and said structural member; and (e) a pair of locking bolts for extending through said mounting plate holes for threadedly engaging said threaded mounting holes.

2. The walker assist device carrier of claim 1 wherein said plurality of threaded mounting holes are formed in a circular pattern.

3. The walker assist device carrier of claim 2 wherein said plurality of threaded mounting holes formed in a circular pattern and are positioned at 45° intervals about the circular pattern.

4. A walk assist device carrier comprising:

(a) a rigid tubular member having a rectangular cross-section and a top and a bottom wall and having internally centrally disposed arcuate sections formed in said top and bottom wall;

(b) a plurality of threaded holes formed in a plurality of patterns in the top wall of said rigid tubular member, said threaded holes of each pattern arranged having opposing pairs of threaded holes spaced a predetermined distance with respect to each other;

(c) a mounting plate having a pair of unthreaded mounting plate holes extending therethrough, said mounting plate holes spaced said predetermined distance with respect to each other;

(d) said mounting plate having an arcuate grooved formed in a bottom surface thereof extending along an arcuate groove axis for engaging and clamping a structural member of a wheelchair, walker or other conveyance between said mounting plate and said structural member; and (e) a pair of locking bolts for extending through said mounting plate holes for threadedly engaging said threaded mounting holes.

5. The walker assist device carrier of claim 4 wherein said plurality of threaded mounting holes of each pattern are formed in a circular pattern.

6. The walker assist device carrier of claim 5 wherein said plurality of threaded mounting holes of each pattern are formed in a circular pattern and are positioned at 45° intervals about the respective circular pattern.

* * * * *